Dec. 1, 1925.
B. F. HAYDEN
BRICKMAKING MACHINE
Filed Oct. 12, 1923
1,564,067
3 Sheets-Sheet 1
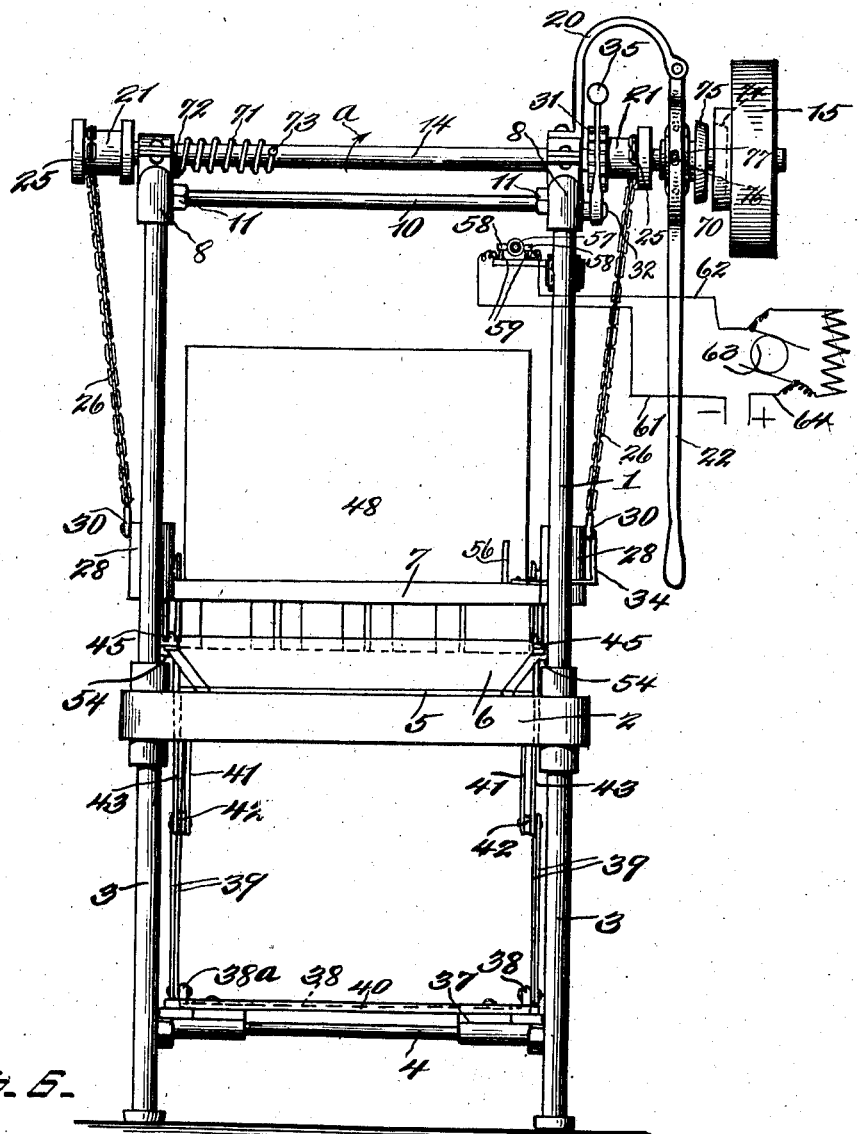
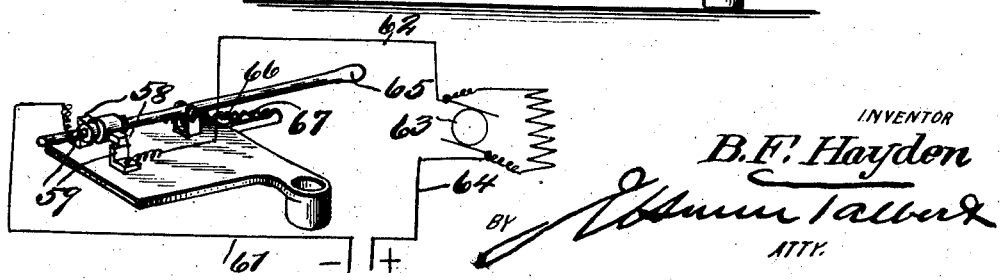
INVENTOR
B. F. Hayden

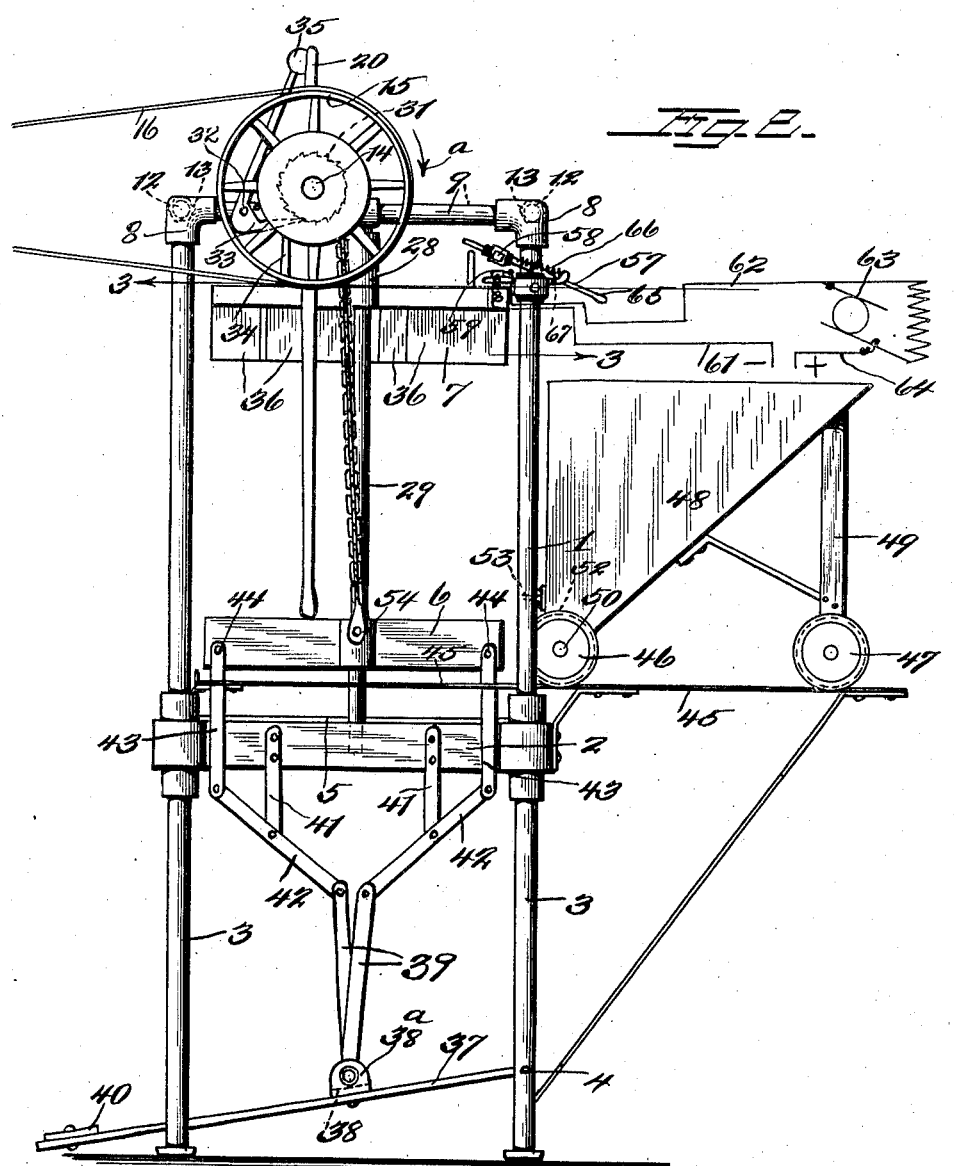

Dec. 1, 1925.
B. F. HAYDEN
1,564,067
BRICKMAKING MACHINE
Filed Oct. 12, 1923    3 Sheets-Sheet 3
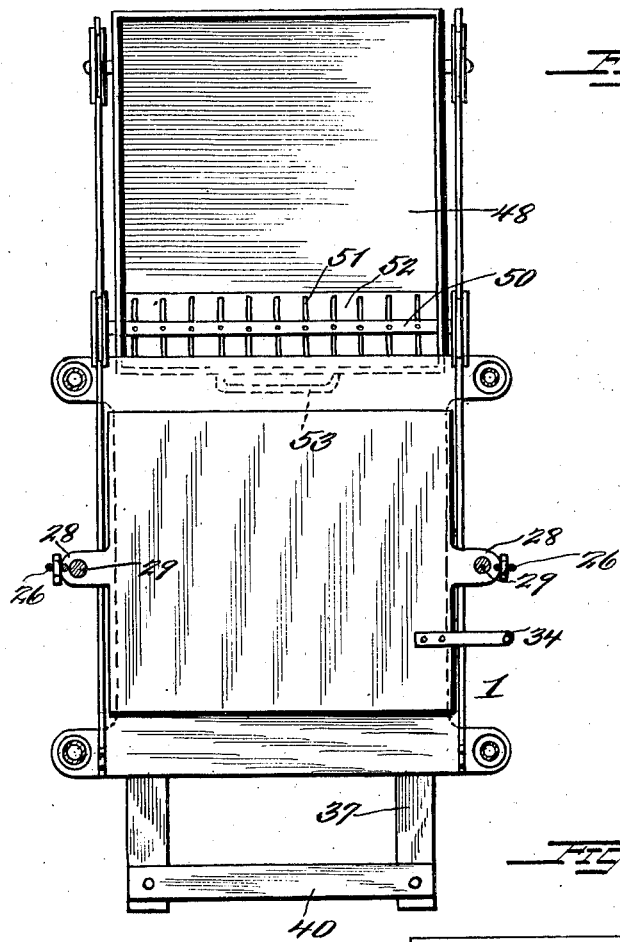
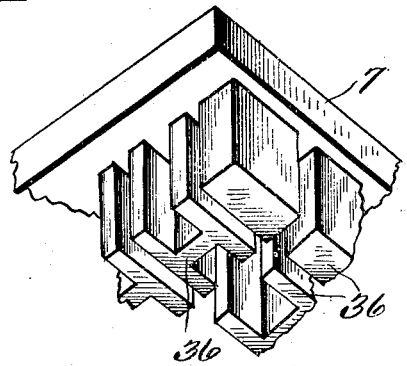
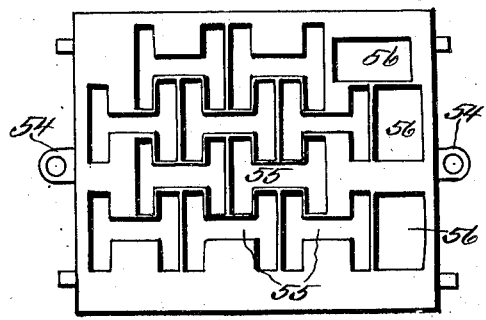
INVENTOR
B. F. Hayden
BY
ATT'Y.

Patented Dec. 1, 1925.

1,564,067

UNITED STATES PATENT OFFICE.

BENJAMIN F. HAYDEN, OF SPRINGFIELD, MISSOURI, ASSIGNOR TO HAYDENITE BRICK AND MACHINERY COMPANY, A CORPORATION OF MISSOURI.

BRICKMAKING MACHINE.

Application filed October 12, 1923. Serial No. 668,203.

*To all whom it may concern:*

Be it known that BENJAMIN F. HAYDEN, a citizen of the United States, residing at Springfield, in the county of Greene and State of Missouri, has invented new and useful Improvements in Brickmaking Machines, of which the following is a specification.

The present invention has for its purpose to provide a construction of brick making machine wherein a gravity actuated tamper is employed for tamping the plastic material in the molds, the mold being so disposed on a drying board on which the bricks are molded that the mold may be raised after the tamper has been lowered to its maximum distance, whereby the drying board with bricks thereon may be removed from under the mold.

Another purpose is the provision of means, in the construction of a brick making machine, manually actuated and operatively connected to the mold for raising it, said operative connections between said manual means and the mold being such as to require minimum pressure in order to raise the mold.

Still another purpose is to provide, in a brick making machine, means for raising the gravity actuated tamper subsequently to tamping the material in the mold, in conjunction with means for holding the tamper in a raised position.

A further purpose is the provision of a brick making machine including a mold for molding an U-shaped brick or building block which may be so employed, in constructing a wall, as to provide inter-connected passages through the wall in order to permit of a free circulation of air.

A still further purpose is to provide a mold for a brick making machine wherein the compartments for the reception of plastic material are of H-shaped construction, the purpose being to permit the compartments to be arranged in a compact form in order to permit a number of compartments to be arranged in a relatively small mold member. In fact, the compartments are disposed in interlocked relation so that a very small mold body or member may be provided with a number of brick molding compartments. However, the mold also has compartments for molding the ordinary form of rectangular brick.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in front elevation of the improved machine constructed in accordance with the invention and showing the tamper lowered in the mold.

Figure 2 is a view in side elevation of the improved brick making machine, showing the tamper raised to its maximum height and also showing the mold raised so that the drying board with the bricks thereon can be removed.

Figure 3 is a plan view of the brick making machine, more clearly showing the interior construction of the hopper with the agitator therein.

Figure 4 is a plan view of the mold member, showing the brick receiving compartment.

Figure 5 is a detail view of a portion of the tamper, showing the members which enter the plastic material receiving compartments for constructing the bricks.

Figure 6 is a detail perspective view illustrating the controlling means for the driving roller.

Referring to the drawings, 1 designates the frame as a whole comprising a platform 2 supported the requisite distance above the floor by means of standards 3 which project beyond the platform, and 4 denotes a pivot rod which connects two of the standards. The platform 2 is designed for the reception of the drying board 5 on which the bricks are molded by means fo a mold 6 and a tamper 7. The upper ends of the forward and rear upward extensions of the standards 3 have elbows 8 which are connected by the transversely disposed tubular rods 9. The forward elbows 8 are connected by a rod 10, there being lock nuts 11 to insure rigidity while the rear elbows are likewise connected and reinforced by a rod 12 including lock nuts 13.

Journaled in suitable bearings supported upon the transverse rods or pipe sections 9 is a shaft 14 to which power may be belted in any suitable manner, preferably by a pulley 15, belt 16 and motor 17. Supported upon one of the bearings 19 is a bracket 20 which overhangs one of the pulleys 21 and pivotally supported upon the bracket is a clutch lever 22.

Attached at 25 to the pulleys 21 are chains 26 which are adapted to wind upon and reel from the pulleys for the purpose of raising and lowering the tamper 7. The tamper 7 has at its opposite ends guide sleeves 28 which are guided upon the upright guide rods 29 which connect the platform and the transverse connecting rods 9. These guide rods are rigid and act to hold the tamper and the mold in alinement so that the former will accurately enter the latter when the former is lowered. The chains 26 are attached at 30 to the tamper and obviously, when the shaft 14 is rotated, the chains 26 wind upon the pulleys 21, thereby raising the tamper.

One of the pulleys 21 to one side of its groove (which receives the cable when winding thereon) is provided with a plurality of ratchet teeth 31 and pivoted at 32 upon one of the rods 9 at the forward portion of the machine is a gravity actuated dog 33, the nose of the short arm of which is designed to engage the teeth 31, thereby acting to hold the pulley and shaft against rotation. However, this holding action is not performed until the tamper is in an elevated position, in fact, raised to its maximum distance above the mold. When the tamper reaches its position a maximum distance above the mold, a projection 34 on the tamper contacts with a portion of the nose of the dog, forcing the extremity of the nose in engagement with one of the teeth 31 against the action of the weight 35 at the upper end of the long arm of the dog.

When the shaft is rotated in the direction of the arrow $a$ to permit the cables to unwind from the pulleys, the weighted end of the dog having been moved in the direction of the pulley, the tamper drops by gravity and the mold receiving tamper members 36 will enter the various compartments of the mold and tamp the plastic material in the compartments. The mold is in the form of an open framework and its height and construction are such as to permit the mold to be moved over the members 36 until the upper edge of the mold body engages with the under face of the tamper. When this action occurs, it is possible to remove the drying board or pallet forwardly of the machine. It is necessary, however, to slightly raise the tamper when removing the drying board or pallet so as to prevent the upper faces of the bricks from scraping against the members 36 and thereby avoid any destruction to the corners or edges of the bricks.

Pivotally supported upon the pivot rod 4 is a conventional treadle 37 which has a transverse bar 38 and pivotally connected to ears 38ª at the opposite ends of this bar are links 39. The outer free end of the treadle carries a suitable foot-board 40 whereby foot pressure may be applied to the treadle for actuating the same. Depending from the platform 2 are arms 41 to which oscillatory levers 42 are pivotally connected. The adjacent ends of the levers 42 are pivoted to the links 39. The remote ends of the levers 42 are, in turn, pivoted to links 43 which, in turn, are pivoted at 44 to the ends of the mold. Obviously, when pressure is applied to the foot-board 40, the treadle is moved downwardly, rocking the levers 42 which will impart upward movement to the links 43 which will cause the mold 6 to raise vertically upon the guide rods 29. In fact, the tamper has a marginal projecting portion with which the mold may engage when raised sufficiently so as to raise the tamper a slight distance to permit the drying board or pallet to be removed from the platform.

Projecting rearwardly of and supported by the frame are tracks 45 upon which the supporting wheels 46 and 47 of the hopper 48 engage. The hopper is of triangular formation, although it is obvious that it may be any other suitable shape, and the wheels 47 are carried by the reinforced depending legs 49 while the wheels 46 are rotatable with a shaft 50 which is provided with radial projections 51. The shaft 50 with its projections constitutes a suitable agitator which operates revolubly at the outlet mouth 52 of the hopper so as to agitate and break up the plastic material which discharges from the hopper. In fact, the projections not only act to break up but also mix the material more thoroughly as it discharges.

When the mold is lowered to rest upon the drying board or pallet, which has been previously inserted in position, and the tamper raised to a position a maximum height above the drying board or pallet, the hopper is moved upon its tracks by grasping the handle 53 and as the discharge mouth of the hopper passes the molding compartments, the plastic material readily passes from the hopper into the various compartments. After feeding the material into the compartments, the hopper may be operated rearwardly from under the tamper and then the tamper is allowed to drop by gravity, whereby the members 36 may enter the brick molding compartments of the mold. These members 36 tamp the material and pack it thoroughly and when it is believed that the material is packed and partially set, the operator depresses the treadle, causing the mold to raise until it contracts with the tamper and, in turn, raises it a very short distance, in fact, just sufficient to permit the lower faces of the members 36 to disengage from the faces of the bricks upon the drying board or pallet. The raising of the tamper relieves the weight upon the bricks and when this is accomplished the drying board or pallet may be removed by sliding it forward. The drying board or pallet with the bricks thereon may be set in some suitable place where the bricks may dry and become more thoroughly set.

As previously stated, the mold is in the form of a rectangular frame and it has on its ends the guide sleeves 54 through which the guide rods 29 pass. The mold frame is provided with a plurality of spaces or compartments 55 which are so arranged and constructed as to form bricks H-shaped and, when the mold is raised, the bricks will remain upon the drying board or pallet in interlocked positions. It is obvious that when using interlocking bricks in this manner a very solid wall may be constructed not so much depending upon the mortar or other plastic material that is usually applied between the bricks. The bricks of this particular shape can be so arranged as to provide an air space on the interior of the wall due to the cavities on opposite sides of the brick.

It will be noted that the mold also has cavities or open spaces 56 for forming the ordinary rectangular shape of brick.

As previously stated, the shaft 14 is driven by motor power being belted to the shaft so as to rotate the same for raising the tamper. In order to stop the motor when the tamper has been raised to a position a maximum height above the mold so as to enable the hopper to pass under the same, a projection on the tamper engages one arm of a rocking lever 57, separating the contacts 58 carried by one arm of the lever from the contacts 59 which are carried on the frame of the machine. The contacts 58 are carried by the lever and are insulated therefrom. The contacts 59 are also insulated from the frame of the machine. One of the contacts 59 is wired by means of a lead 61 to the negative side of a source of electrical supply while the other contact 59 is connected by a lead 62 with the motor 63 which, in turn, is connected by a lead 64 with the positive side of the source of electrical supply. Obviously, when the lever 57 is tilted, disengaging the contacts 58 from the contacts 59, the circuit is broken, thereby stopping the motor and also arresting the shaft 14 in its revoluble movement. As soon as the motor ceases to operate, the tamper has raised a sufficient distance to cause the projection 34 to engage with the dog 33 so as to cause the nose thereof to engage one of the ratchet teeth 31 on one of the pulleys 21, thereby holding the tamper in a raised position.

The lever 57 has a handle 65 and connected to the lever is a spring 66. The spring is, in turn, connected to the frame and is so disposed with relation to the pivot of the lever that, when the lever is moved by the projection on the tamper, the spring will contract on one side of the pivot and retain the contacts out of engagement. The lever is limited in this position by an abutment 67. When the dog is released in order to permit the tamper to drop by gravity, the lever 57 is then free to be actuated manually by grasping the handle 65 to bring the contacts again into engagement. However, this is not performed until it is necessary to raise the tamper. For instance, after the tamper has lowered by gravity and has tamped the plastic material in the mold and then the tamper and the mold slightly raised and the bricks removed, the operator may then actuate the handle and put the contacts in engagement which will cause the tamper to raise and when it has reached its highest point the circuit to the motor is again broken. After the bricks have been removed, pressure upon the treadle is relieved, in which case the mold returns by gravity to its lowered position.

When the tamper is allowed to fall, the shaft 14 will rotate very rapidly. The tamper is allowed to fall by first releasing the clutch 70 and then releasing the dog 33. In order to prevent the chains 26 from rewinding upon the pulleys or drums 21 after the tamper reaches its lowered position, a suitable coil spring 71 surrounds the shaft 14 with one end thereof fastened at 72 to one of the bearings in which the shaft 14 is mounted, while its other end is attached at 73 to the shaft. When the chains are wound upon the pulleys or drums 21, this coil spring is expanded and when the chains unwind, the spring is tightened upon the shaft, thereby preventing the shaft from continuing its rotation when the tamper reaches its lowered position, thus preventing the chains from rewinding from the drums or pulleys 21.

The clutch 70 comprises a friction clutch hub 74 carried by the drive pulley 15, there being a friction clutch 75 keyed on the shaft 14. The pulley 15 is loosely mounted and obviously when the friction clutch 75 is moved to frictionally contact with the depression in the friction hub 74, the shaft 14 will rotate with the pulley for imparting movement to the drums or pulleys 21 for the purpose of winding the chains on the pulleys and hoisting the tamper to its raised position.

The clutch lever 22, previously mentioned, is pivoted upon the bracket 20 and has a loop portion in diametrically opposite sides of which diametrically opposite pins 76 engage. These pins are carried by a clutch moving ring 77 which operates in a groove in the body of the friction clutch 75. This ring, as is the usual construction, consists of the two semicircular parts which are fastened together in the usual manner, so that the ring will act to move the clutch member. The ring is made in two sections for the purpose of applying the ring to the groove in the body of the clutch. As previously stated, the clutch member is keyed to the shaft 14 and as soon as it is moved into engagement with the depression in the clutch hub 74, the shaft 14 may rotate with the pulley 15. The clutch lever 22 may have a suitable rack (not shown) with which a conventional form of dog (not shown but adapted to be carried by the lever 22) engages so as to hold the clutch lever in different positions, in fact, in a position when the clutch is out of gear and in a position when in gear with the clutch member 74.

The invention having been set forth, what is claimed is:

1. In a brick making machine, a frame including a platform and a hopper, a pallet supported on the platform, a mold resting upon the pallet and provided with brick molding spaces, a gravity actuated tamper having members to enter said spaces, means for raising the mold and the tamper a distance slightly greater than the height of the bricks, whereby the pallet with the bricks thereon may be removed, means for raising the tamper to a position equal to the height of the hopper to permit the latter to pass thereunder, and automatic means for stopping the raising means to limit the tamper to a position a maximum distance above the mold.

2. In a brick making machine, a frame including a platform and a hopper, a pallet supported on the platform, a mold resting upon the pallet and provided with brick molding spaces, a gravity actuated tamper having members to enter said spaces, means for raising the mold and the tamper a distance slightly greater than the height of the bricks, whereby the pallet with the bricks thereon may be removed, means for raising the tamper to a position equal to the height of the hopper to permit the latter to pass thereunder, means for stopping the raising automatic means to limit the tamper to a position a maximum distance above the mold, and means for holding the tamper in a raised position.

3. In a brick making machine, a frame including a platform and a hopper, a pallet supported on the platform, a mold resting upon the pallet and provided with brick molding spaces, a gravity actuated tamper having members to enter said spaces, means for raising the mold and tamper a distance slightly greater than the height of the bricks whereby the pallet and bricks thereon may be removed, means for raising the tamper to a position equal to the height of the hopper to permit the latter to pass thereunder, means for stopping the raising means to limit the tamper to a position a maximum distance above the mold, and automatic means for holding the tamper in a raised position.

4. In a brick making machine, a frame including a platform and a hopper, a pallet supported on the platform, a mold resting upon the pallet and provided with brick molding spaces, a gravity actuated tamper having members to enter said spaces, means for raising the mold and tamper a distance slightly greater than the height of the bricks whereby the pallet and bricks thereon may be removed, means for raising the tamper to a position equal to the height of the hopper to permit the latter to pass thereunder, and automatic means for stopping the raising means to limit the tamper to a position a maximum distance above the mold, and automatic means for holding the tamper in a raised position.

5. In a brick making machine, a frame including a platform, a pallet supported thereon, a mold resting upon the pallet and provided with brick molding spaces, a gravity actuated tamper having members to enter said spaces, means for raising the mold and the tamper a distance slightly greater than the height of the bricks, whereby the pallet with the bricks thereon may be removed, means for raising the tamper to a position equal to the height of a hopper which passes thereunder, means for stopping the raising means to limit the tamper to a position a maximum distance above the mold, and means actuated by a member on the tamper to engage with an element of the raising means to hold the tamper in a raised position a maximum distance above the mold.

6. In a brick making machine, a frame including a platform and a pallet resting thereon, a mold resting upon the pallet, a tamper cooperative with the mold for shaping the bricks therein, motor driven means for raising the tamper a substantial distance above the mold whereby a hopper may pass thereunder, a hopper operable over the mold for filling the same while the tamper is in a raised position, and means including an electric circuit operative with the motor and actuated by a member on the tamper for breaking the circuit and stopping the motor.

7. In a brick making machine, a frame including a platform and a pallet resting thereon, a mold resting upon the pallet, a tamper cooperative with the mold for shaping the bricks therein, motor driven means for raising the tamper a substantial distance above the mold whereby a hopper may pass thereunder, a hopper operable over the mold for filling the same while the tamper is in a raised position, means including an electric circuit operative with the motor and actuated by a member on the tamper for breaking the circuit and stopping the motor, and means actuated by a member on the tamper and cooperatively connecting with an element of said raising means to hold the tamper in a raised position while the hopper passes thereunder.

8. In a brick making machine, a frame including a platform and a pallet resting thereon, a mold resting upon the pallet, a gravity actuated tamper cooperative with the mold to form bricks therein, a mechanism including let-out means for hoisting the tamper, and means for preventing rewinding of the let-out means.

9. In a brick making machine, a frame including a platform and a pallet resting thereon, a mold resting upon the pallet, a gravity actuated tamper cooperative with the mold to form bricks therein, a mechanism including let-out means for hoisting the tamper, means for preventing rewinding of the let-out means, and manually actuated means operatively connected with the mold for raising the same and the tamper simultaneously a short distance whereby the pallet with the bricks thereon may be removed.

10. In a brick making machine, a frame including a platform and a pallet resting thereon, a mold resting upon the pallet, a gravity actuated tamper cooperative with the mold to form bricks therein, a mechanism including let-out means for hoisting the tamper, means for preventing rewinding of the let-out means, power driven means operatively connected with the tamper for raising the same a substantial distance, means actuated by a member on the tamper to engage said means with an element of said power driven means to retain the tamper in a raised position a substantial height above the mold, and a hopper operatively mounted on the frame and adapted to pass under the tamper to fill the brick molding spaces.

11. In a brick making machine, a frame including a platform and a pallet resting thereon, a mold resting upon the pallet, a gravity actuated tamper cooperative with the mold to form bricks therein, a mechanism including let-out means for hoisting the tamper, means for preventing rewinding of the let-out means, power driven means operatively connected with the tamper for raising the same a substantial distance, means actuated by a member on the tamper to engage said means with an element of said power driven means to retain the tamper in a raised position a substantial height above the mold, a hopper operatively mounted on the frame and adapted to pass under the tamper to fill the brick molding spaces, means including an electric circuit operative with the motor and actuated by a member on the tamper for breaking the circuit and stopping the motor, and manual means operatively connected with the mold for raising the same and the tamper a short distance whereby the pallet with the bricks thereon may be removed.

12. A hopper for a brick making machine comprising a hopper body provided with an outlet end, supporting wheels for the hopper, and an agitator mounted in the outlet end and operatively connected with one set of wheels for agitating the material as it discharges.

13. A mold for brick making machines comprising a mold frame provided with a plurality of spaces H-shaped in plan view, said spaces being open at the top and bottom and occupying substantially the whole surface of the frame.

14. The combination with a brick mold for brick making machines, said mold provided with a plurality of H-shaped compartments open at their upper and lower ends, of a tamper having correspondingly shaped tamping members to enter said compartments.

15. In a brick making machine, a frame including a platform and a pallet resting thereon, a mold resting upon the pallet, a gravity actuated tamper cooperative with the mold to form bricks therein, a shaft including drums, hoisting means connecting the drums and the tamper, and means cooperative with the shaft for retarding the same when the tamper lowers and thereby preventing the hoisting means from rewinding upon the drums when the tamper reaches its lowered position.

In testimony whereof he affixes his signature.

BENJAMIN F. HAYDEN.